Nov. 4, 1947. R. R. RAZEE 2,430,077
TARGET TRAP
Filed Sept. 2, 1944
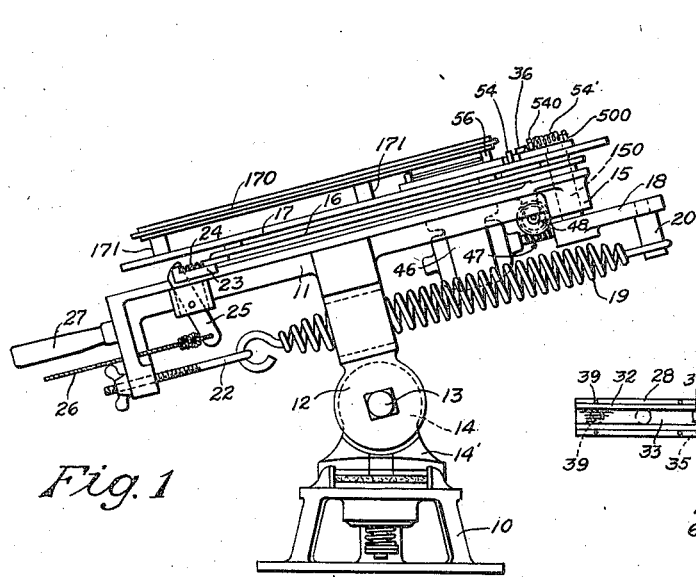
INVENTOR.
RUSH R. RAZEE
BY Harold L. Gammons
AGENT Patented Nov. 4, 1947

2,430,077

UNITED STATES PATENT OFFICE 2,430,077

TARGET TRAP

Rush R. Razee, Denver, Colo., assignor to Remington Arms Company, Inc., Bridgeport, Conn., a corporation of Delaware Application September 2, 1944, Serial No. 552,455

8 Claims. (Cl. 124—9)

This invention relates to a trap for throwing targets, and in particular, clay targets or "pigeons" such as used in skeet and trap shooting.

An object of the invention is the provision of a target trap which is of simple compact construction and adapted to throw targets at unpredictable angles. A further object is to provide an auto-angling target trap. A still further object is the provision of an auto-angling mechanism of relatively simple construction adapted for assembly on target traps which are not provided with means for automatically throwing targets at unpredictable angles.

These and other objects, features, and advantages of the invention will be apparent from the following description and accompanying drawings which describe and illustrate an exemplary embodiment of the invention. It will be understood, however, that all modifications of the embodiment shown falling within the scope of the appended claims are part of the present invention.

In the drawing:

Fig. 1 is a side elevation of a target trap embodying the auto-angling device of this invention.

Fig. 2 is a plan view of the trap and auto-angling device shown in Fig. 1, part of the trap being shown in phantom view and including only a fragmentary portion of the carrier guide rail.

Fig. 2a is a fragmentary plan view of the target engaging finger and latch in locked position.

Fig. 3 is a fragmentary portion of the trap shown in Fig. 2 with the carrier swung around through substantially 120° and showing the target being discharged from the carrier.

Fig. 4 is a view similar to Fig. 3 but with the carrier swung around substantially 50°.

Fig. 5 is an elevation of the trap, partly in section, on lines 5—5 of Fig. 4. Fig. 5 also includes a cover plate for the auto-angling mechanism.

Fig. 6 is a fragmentary plan view of a modification of the target engaging finger and latch shown in Fig. 2a, the engaging surfaces of the respective parts having slightly bevelled surfaces.

In trap shooting, or straight trap shooting as distinguished from skeet shooting, the target field is substantially semi-circular in shape and of substantially 50 yards radius. Of this area, the portion measured by angles of substantially 45° on both the right and left sides of the center line of the field is designated as the target flight area, the span of which may be increased both to the right and left by as much as 20°. The trap is located at the center of the base line of the field and shooters take stations at a predetermined distance to the rear of the trap. The trap is cocked and released by a puller who is stationed to the rear of the shooters, the trap being loaded with targets either automatically or by a boy in the trap house. It is desirable, from the standpoint of interest and skill, to vary the direction of flight of the targets throughout the target area and to this end traps have been built embodying mechanism for automatically changing the angles of flight of the targets. Moreover, strenuous efforts have been made to provide an angling mechanism which will not repeat its angling cycle often enough or be of such simplicity as to be readily discovered by the shooters. In general, auto-angling devices have been cumbersome, relatively complicated, and quite expensive.

The present invention provides a trap of simple and inexpensive construction which is adapted to throw targets automatically and at unpredictable angles throughout the target area, there being in effect no discernible angling cycle.

Referring to the drawings, Fig. 1 shows a trap adapted to embody the auto-angling device of this invention. In general, the trap comprises a fixed base 10 and a frame 11 supported on the base. The frame supporting means or leg 12 may be adapted to support the frame 11 for adjustment vertically so as to change the elevation of flight of the targets, in which case the leg 12 may have a disk-shaped portion adapted to be pivoted centrally by fastening means 13 to a corresponding disk-shaped portion 14 formed integrally with and extending substantially vertically from a turret 14' mounted on the base 10. The utility of the trap may be increased further by mounting the turret 14' for rotation on the base 10 to permit manual adjustment of the frame angularly with respect to the target flight area.

The frame 11 is provided at its forward end with a bearing 15 within which a shaft 150 is rotatably mounted. The carrier head 16 is fastened to the upper end of the shaft 150 and carries a target throwing arm or carrier 17 which is secured to the carrier head 16 by suitable screws 16'. The carrier 17 is provided with a suitable target guide rail 170 which is spaced from the upper surface of the carrier by suitable blocks 171 in which are inserted screws 172 for attaching the rail to the carrier. The lower end of the shaft 150 has secured to it a crank arm 18 which is positioned substantially 180° with respect to the carrier 17. The main spring 19 is secured at one end to a stud 20 on the outer end of the crank arm 18 and its opposite end to an eye bolt 22 secured in the rear end of the frame 11. The spring 19 is tensioned for swinging the carrier through its throwing arc by rotating the carrier around to the position shown in Fig. 2, in which position a pawl 23 pivotally mounted on the frame 11 and spring loaded, as at 24, is adapted to engage the carrier head 16 to hold the carrier in cocked position. A trigger 25 is shown pivotally supported on the frame 11 and is adapted to be actuated by means of a lanyard 26 to disengage the pawl 23 from the carrier head and release the carrier for discharging a target therefrom. The frame may be provided with a handle 27 for rotating the frame on the base.

The foregoing description is of a trap which is adapted to embody the auto-angling device of this invention, either as a part of the trap as manufactured, or as an attachment adapted to be readily mounted on the trap. The trap per se is shown and described more fully in the Lorimer patent, No. 1,867,578, July 19, 1932, and has been selected merely to illustrate the present invention. It will be understood that the present invention is not limited in its application to the particular trap shown in the drawing, but may be used on other types of target traps.

The auto-angling device of this invention is mounted on the trap frame 11 and the target carrier 17, and embodies a substantially rectangular guide member or block 28 substantially channel-shaped in cross-section and adapted to be secured to the frame 11 of the trap at substantially right angles to its longitudinal axis. To this end the frame 11 may be provided with an apron 29 formed integrally thereon as shown in the drawing, the upper surface of the apron being in the plane of the upper surface of the frame 11 and having a laterally extending reach 29', see Fig. 5. An obvious modification would be to form the apron 29 as a separate member adapted to be readily attached to the side of the trap frame.

The guide block 28 may be secured by screws 30, or other fastening means, to the reach 29' and is adapted to receive a traveler or slide 32 which is substantially channel-shaped in cross section and adapted to slide freely in the guide block 28. The traveler 32 is provided with a substantially rectangular recess 33 in its upper surface and extending longitudinally thereof. As shown in Figs. 2, 4 and 5, a wall 34 is provided at one end of the traveler and is apertured at 35, the width of the aperture being substantially equal to the width of the recess 33, this end wall constituting tripping means for effecting the release of a target on the carrier, as hereinafter described.

Mounted in the recess of the traveler 32 is a link 36 of substantially rectangular cross-section and adapted to make a smooth running fit in the recess 33. The rear end of the link 36 is provided with an upstanding stud 37 while the forward end of the link extends through the aperture 35 in the wall 34 of the traveler. The forward end of the link is adapted to be secured to a latch, as hereinafter described. The height of the aperture 35 is such as to prevent egress of the stud 37 from the recess 33, the stud 37 being adapted to abut the wall 34 of the traveler as the link 36 is drawn through the aperture 35. The wall 34 thus acts to positively stop the movement of the link 36 relative to the traveler.

Fig. 5 shows a rectangular cover plate 38 which may be secured on the upper edges of the guide block 28 by fastening means, such as screws 38' secured in holes 39 of the guide block.

Formed integrally, or otherwise secured on the bottom of the traveler 32 on its longitudinal axis and substantially intermediate its ends is a depending stud 40 which projects through an elongated slot 42 in the bottom of the guide block 28 and an underposed slot 42' of similar shape in the reach 29' of the apron 29. The lower end of the stud 40 is shown having a reduced portion 43 which may be provided with a suitable roller or similar anti-friction device.

The reduced portion or roller 43 of the stud 40 is adapted to be engaged in intersecting grooves 44 of a rotatable drum 45 which is rotated by a motor 46, or other power source, through a speed reduction drive such as the worm 47 and wheel 48. The drum 45 is supported by suitable bearing brackets 49 on the underside of the reach 29' and is driven by the worm and wheel drive at a speed such that the traveler 32 will be reciprocated in the guide block 28 at a relatively slow speed, of the order of substantially one foot per second.

Carried freely on the upper end of the carrier shaft 150 is a latch 50 having a substantially rectangular nose portion 52 of reduced cross section, see Fig. 2a, and provided with an active surface 52' substantially at right angles to a radial line of the shaft 150. That end of the link 36 opposite the end having the stud 37 is shown pivotally secured by a pin 53 to the nose portion 52 of the latch, the pivotal connection being in a plane between and substantially parallel to the plane of the target guide rail 170 and the plane of the upper surface of the carrier. A pin 54 is fixed to the carrier 17 in the path of movement of the latch 50 and constitutes a stop to pick up the latch and return it to its normal position when the carrier is cocked, as hereinafter described. A light tension spring 54' is shown connected at one end to a latch stud 500 located diametrically opposite the nose portion 52 of the latch 50; and at its opposite end to a stud 540. The latter is shown fixed on one edge of the guide block 28, or if the cover 38 is used, then the stud 540 may be fixed to the top of the cover. The spring 54' is thus adapted to urge the latch 50 into contact with stud 54 for all positions of the carrier. Although the spring 54' is shown as a tension spring, an obvious modification would be to provide a compression spring suitably mounted between the end of the guide block 28 and the pivot pin 53 of the latch 50.

A member shown at 55 is adapted to engage and hold a target on the carrier 17 and to be actuated to disengage the target during the movement of the carrier through its throwing arc for discharging a target therefrom. The target engaging and releasing member 55 comprises an arcuate finger pivoted freely at its rear end on a pin 56 fixed in the upper surface of the carrier 17. The pin is provided with a transverse hole 56', see Fig. 2a, in which is fixedly secured, in any suitable manner, one end of a wire spring 57, the opposite end of the spring being similarly secured to a pin 58 carried on the outer end or reach 55' of the finger 55. The spring 57 is substantially straight in its unstressed condition and the longitudinal axis of the hole 56' of the fixed pin 56 is disposed at a suitable angle to the longitudinal axis of the carrier 17 such that when the spring 57 is unstressed, the finger 55 will be pivoted outwardly away from the rear edge of the carrier, as shown in Figs. 3 and 4. The finger 55 is adapted to pivot on the fixed pin 56 in a plane between the guide rail 170 and the top of the carrier 17. The fixed pin 56 is also used as a spacer block and support for the rear end of the guide rail 170, the latter terminating short of the pivotal connection 53 of the latch 50 and link 36 to avoid interference therewith as the carrier swings around through its throwing arc. A screw 172 is provided, see Fig. 5, for fastening the end of the rail 170 to the fixed pin 56.

Formed in the rear end of the finger 55 and in the outer edge thereof is a substantially rectangular notch 59 having an active surface 59', see Fig. 2a, which is adapted to engage the active surface 52' of the nose 52 of the latch 50. Normally, that is to say, when the latch 50 is substantially free to move with the finger 55, the active surfaces 59' and 52' of the finger and latch respectively are locked in mutual engagement by the stressed spring 57, the force of which acts to pivot the finger 55 clockwise, see Figs. 2 and 2a, thereby moving or tending to move its active surface 59' into abutting engagement with the active surface 52' of the latch 50, the line of action of the force being substantially at right angles to the mutually engaged surfaces of the latch and finger. The latch and finger are thus locked together and will move together in this relationship as the carrier swings around through its throwing arc. The finger 55 being locked by the latch 50 will move with the carrier through the throwing arc of the carrier until such time as the latch 50 is positively restrained from further movement with the finger 55. When this occurs, the nose 52 of the latch will be disengaged from the notch 59 of the finger, simultaneously releasing the finger 55 and the latter will be immediately swung outwardly and rearwardly of the carrier by the spring 57, as shown in Figs. 3 and 4. As pointed out above, engagement of the wall 34 of the reciprocating traveler 32 with the stud 37 of the link 36 trips the latch 50 and positively disconnects it from the finger 55.

The latch 50 and finger 55 are adapted to be reengaged by moving the carrier 17 back to its cocked position. To this end, the pin 54 of the carrier prevents the latch 50 from being swung by centrifugal force past the notch 59 of the finger 55 when the carrier is released and the force of the latch spring 54' moves the latch back into engagement with the pin 54 for reengagement with the notch of the finger 55. Further, a fixed stud 60 is provided on the apron 29 and is adapted to engage the outer curved edge of the finger 55 as the carrier is moved into cocked position to pivot the finger counterclockwise relative to the carrier and stress the spring 57. During the clockwise movement of the finger 55 and carrier 17, the corner of the notch 59 may engage the adjacent corner of the nose 52 of the latch moving it clockwise slightly away from its pin 54 sufficiently so that the nose of the latch will clear the corner of the notch; and thereafter the force of the light coil spring 54' will again pivot the latch counterclockwise moving its nose 52 into the notch 59 of the finger 55.

Referring to Fig. 2 in which the carrier 17 is shown in cocked position with a target T supported on the carrier and held thereon by engagement with the reach 55' of the finger 55; the traveler 32 is shown at the extreme left hand end of the guide block 28. In this position the pin 37 of the link 36 has been engaged by the wall 34 of the traveler and drawn to the left, thereby pulling the latch 50 clockwise sufficiently to disconnect its nose 52 from the notch 59 of the finger 55. The finger 55 would automatically swing outwardly and rearwardly when disconnected from the latch 50, as described above, but the fixed stop 60 on the apron 29 will positively hold the finger 55 in engagement with the target T on the carrier as long as the latter is in cocked position. It will be clear, however, that as soon as the carrier is released by pulling the trigger 25, carrier 17 and finger 55 will move away from the fixed stop 60 thereby allowing the spring loaded finger 55 to move outwardly and rearwardly with respect to the carrier. This movement of the finger is also augmented by the centrifugal force developed during the movement of the carrier through the throwing arc. Consequently, the target T is disengaged almost at once by the reach 55' of the finger and, hence, is free to slide down the carrier 17 as soon as the latter begins to swing through the throwing arc. As a consequence, the target will be discharged into the target area at an angle to the extreme right of the center line of the field.

Assuming now that the reciprocating traveler 32 is approaching or is at the extreme right hand end of the guide block 28, see Fig. 3, at the time the carrier 17 is released from its cocked position; the stud 37 of the link 36 will be at the extreme left hand end of the traveler, having been moved into this position by the pivoted latch 50 which, as herein above described, will have been picked up and rotated counterclockwise by the pin 54 of the carrier as the latter is returned from its discharge position to its cocked position. The stud 37 will therefore be free to slide the entire length of the traveler 32 before bringing up against the end wall 34 thereof. Consequently, the latch 50 will remain in locked engagement with the finger 55 and the target T will be held on the carrier 17 by the reach 55' of the finger 55 until the carrier has swung around through an arc of substantially 120°. Thereupon, the latch 50 will be tripped by the stud 37 of the link 36 bringing up against the wall 34 of the traveler. The reach 55' of the unlocked finger 55 will then disengage the target T permitting the latter to be discharged from the carrier at an angle which, in this instance, is at the extreme left of the center line of the field.

Fig. 4 illustrates one position of the traveler 32 in the guide block 28 for throwing a target at an angle between the two extremes illustrated in Figs. 2 and 3, the release of the target and reengagement of the latch and finger being as described above.

It will be appreciated that inasmuch as the traveler 32 is being continuously reciprocated by the above described drive means, the position of the latch, tripping means, and in particular, the end wall 34 of the traveler in the guide block at any given instant is unknown to shooters and any prediction which they might formulate would have to be based upon the degree of regularity with which the trap was cocked and released. Forehand knowledge of the particular angle of flight of any given target is therefore substantially impossible.

Fig. 6 shows a modification of the latch 50 and target engaging finger 55 wherein the active surface of the nose 62 of the latch is provided with a bevel as at 62'. The corresponding active surface 63' of the notch 63 in the finger is also bevelled, the bevels of the two mutually engaging surfaces having a slight negative slope such that the surfaces will engage and disengage with somewhat less friction than surfaces having no such bevel. The active surfaces 62' and 63' are thus inducive to smoother operation.

What is claimed is:

1. A trap for throwing targets comprising a target carrier movable from a discharge position to a cocked position; means to hold said carrier in cocked position; means to move the carrier from its cocked position through a throwing arc to discharge a target from said carrier; a pivoted member adapted to hold a target on said carrier;

and fixed means to engage said pivoted member when said carrier is moved into cocked position to move said pivoted member into target holding position.

2. A trap for throwing targets comprising a target carrier movable from a discharge position to a cocked position; means to hold said carrier in cocked position; means to move the carrier from a cocked position through a throwing arc to discharge a target from said carrier; a pivoted member adapted to hold a target on said carrier; fixed means to engage said pivoted member when said carrier is moved into cocked position to move said pivoted member into target holding position; and means comprising a latch constructed and arranged to engage and lock said pivoted member when said pivoted member is moved into target holding position by said fixed means.

3. A trap for throwing targets comprising a target carrier movable from a discharge position to a cocked position; means to hold said carrier in cocked position; means to move the carrier from its cocked position through a throwing arc to discharge a target from said carrier; a pivoted member adapted to hold a target on said carrier; fixed means to engage said pivoted member when said carrier is moved into cocked position to move said pivoted member into target holding position; a latch constructed and arranged to engage said pivoted member when said pivoted member is moved into target holding position by said fixed means; and means carried by said pivoted member to lock said pivoted member in engagement with said latch.

4. A trap for throwing targets comprising a target carrier movable from a discharge position to a cocked position; means to hold said carrier in cocked position; means to move the carrier from its cocked position through a throwing arc to discharge a target from said carrier; a pivoted member adapted to hold a target on said carrier; fixed means to engage said pivoted member when said carrier is moved into cocked position to move said pivoted member into target holding position; means comprising a latch constructed and arranged to engage and lock said pivoted member when said pivoted member is moved into target holding position by said fixed means; and means for actuating said latch to unlock said pivoted member and disengage said target at an unpredictable angle during the movement of said carrier from said cocked position through said throwing arc.

5. A trap for throwing targets comprising a target carrier movable from a discharge position to a cocked position; means to hold said carrier in cocked position; means to move said carrier as through a throwing arc to discharge a target from said carrier; a member pivoted on said carrier and adapted to engage a target thereon; a latch on said carrier; resilient means carried by said pivoted member constructed and arranged to hold said pivoted member in locked engagement with said latch whereby said pivoted member is enabled to hold a target on said carrier as said carrier is moved through its throwing arc; and means to disengage said latch from said pivoted member to release said pivoted member at an unpredictable angle during the movement of said carrier through said throwing arc, said resilient means being adapted thereupon to positively swing said pivoted member out of engagement with said target to enable discharge thereof from said carrier and to facilitate reloading said carrier.

6. In a trap for throwing targets comprising a frame; a target carrier and means to move the carrier through a throwing arc; an auto-angling device comprising means to engage a target on said carrier; means operatively associated with said target engaging means to hold said target engaging means in engagement with said target; and means for actuating said holding means comprising a slide, a link movable freely in said slide and connected to said holding means, and means for reciprocating said slide whereby said link is actuated to disengage said holding means from said target engaging means at unpredictable angles during the movement of said carrier through said throwing arc.

7. In a trap for throwing targets comprising a frame; a target carrier, means to move the carrier through a throwing arc; an auto-angling device comprising means to engage a target on said carrier; means operatively associated with said target engaging means to hold said target engaging means in engagement with said target; and means for actuating said holding means comprising a guide to be mounted on said frame, a slide reciprocable in said guide and provided with a tripping means, a link movable freely in said slide, said link being pivotally connected at one end to said holding means and provided at its opposite end with a lug adapted to be engaged by the tripping means of said slide, and means for reciprocating the slide in said guide whereby the lug of said link is engaged by the tripping means of said slide thereby positively holding said link during the throwing movement of said carrier and withdrawing said holding means from engagement with said target engaging means.

8. A trap for throwing targets comprising a target carrier movable from a discharge position to a cocked position; means to hold said carrier in cocked position; means to move said carrier from its cocked position through a throwing arc to discharge a target from said carrier; a member pivoted on said carrier and adapted to engage a target thereon; a latch pivoted on said carrier; resilient means carried by said target engaging member constructed and arranged to hold said target engaging member in locked engagement with said latch whereby said target engaging member is enabled to hold a target on said carrier as said carrier is moved through its throwing arc; and means to disengage said latch from said target engaging member to release said target engaging member at an unpredictable angle during the movement of said carrier through said throwing arc, said resilient means being adapted thereupon to positively swing said target engaging member out of engagement with said target to enable discharge thereof from said carrier and to facilitate reloading said carrier; and a stop member arranged to be engaged by said target engaging member on return of said throwing arm to its cocked position to positively move said target engaging member into reengagement with said latch.

RUSH R. RAZEE.

REFERENCES CITED

The following references are of record in the file of this patent:

UNITED STATES PATENTS

| Number | Name | Date |
| --- | --- | --- |
| 540,318 | Jenkins | June 4, 1895 |
| 833,381 | Fulford | Oct. 16, 1906 |
| 1,728,595 | Carothers | Sept. 17, 1929 |

Certificate of Correction

Patent No. 2,430,077.

November 4, 1947.

RUSH R. RAZEE

It is hereby certified that error appears in the printed specification of the above numbered patent requiring correction as follows: Column 7, line 58, claim 5, strike out "as" and insert instead *from its cocked position*; and that the said Letters Patent should be read with this correction therein that the same may conform to the record of the case in the Patent Office.

Signed and sealed this 30th day of December, A. D. 1947.

[SEAL]

THOMAS F. MURPHY,
*Assistant Commissioner of Patents.*